Patented Sept. 28, 1954

2,690,434

UNITED STATES PATENT OFFICE 2,690,434

ALKYLATION OF DICYANDIAMIDE AND FORMALDEHYDE RESINS

Lucien Sellet, Saddle River, N. J., and William O. Dawson, Amherst, N. H., assignors to Jacques Wolf & Co., a corporation of New Jersey No Drawing. Application July 24, 1951, Serial No. 238,368

8 Claims. (Cl. 260—21)

This invention relates to a resinous material and the method of making it. The invention relates, more particularly, to ethers of dicyandiamide and formaldehyde resin.

The dicyandiamide and formaldehyde resin, serving as the intermediate for use in making the material of the present invention, is prepared as described in application, Serial No. 103,953, filed July 9, 1949, by Lucien Sellet and William O. Dawson for "Dicyandiamide and Formaldehyde Product and Method of Making" and issued as Patent No. 2,567,238 on September 11, 1951. In brief, dicyandiamide, hereinafter sometimes referred to as dicy, and formaldehyde in the proportion of 3.6–5 mols of the latter to 1 of dicy, are warmed in aqueous solution and at pH slightly above 7 until the material passes from the stage of the original water soluble mixture to a resinous polymethylol derivative of dicy. It is considered that a large proportion of the product is the tetramethylol derivative of dicy or a polymer.

This dicy and formaldehyde resin possesses many advantages as an industrial resin. It is, however, not soluble in large proportion in alcohol. When dissolved in water, the resin polymerizes on long standing in the aqueous solution and precipitates on mixing with an aqueous solution of electrolytes.

The present invention relates to new resins some of which are free from the objections listed above to the methylol derivative and some of which new resins are free from one or more of these objections or have other new and useful properties.

Briefly stated, the invention comprises the ethers of the polymethylol derivative of dicyandiamide and the method of making them. In the preferred embodiment, the invention comprises the tetra-lower-alkyl ethers of dicy and formaldehyde resin that are soluble in alcohol, non-polymerizing in aqueous solution, and not sensitive to electrolytes that are precipitants of the dicy and formaldehyde resin.

As to starting materials, there is used dicy and formaldehyde resin in the polymethylol stage. In a modification we make the finished resin from the raw materials in one step.

The alcohol to be used in the etherification with the resinous polymethylol derivative of the dicy is suitably monohydric. In that case, the alcohol should be a lower water soluble alcohol, such as one containing 1 to 3 carbon atoms to the molecule. The alcohol may contain somewhat more carbons if the alcohol is polyhydric. Examples of alcohols that meet the requirements and that may be used are the monohydric aliphatic alcohols, methanol, ethanol, propanol and isopropanol; a polyhydric alcohol, as, for instance, ethylene, propylene, butylene, or diethylene glycol, glycerine, pentaerythritol, and sorbitol; and a sugar such as dextrose, levulose, and sucrose. These alcohols are unsubstituted. The alcohols may be used alone or mixed with each other. The ethers made with the alcohols named above are soluble in water. Water insoluble, higher alcohols may be used in a modification of the preferred method. Thus the ether made with a lower alcohol may be heated with the selected higher alcohol, to liberate the lower alcohol and leave the radical of the higher alcohol in the finished ether. Examples of the higher alcohols that may be used in this manner are butyl, hexyl, octyl, dodecyl, and octadecyl alcohols.

Catalysts used to accelerate the etherification of the selected alcohol with the dicy and formaldehyde resin are acidic. They are used to establish the pH on the acid side below 7. Examples are acetic, formic, sulfuric, and hydrochloric acid, all used in aqueous solution.

The aldehyde for making the dicy resin and the alcohol for etherification may be added jointly to the dicy. Thus the aldehyde and alcohol may be added together in a composition such as one now sold commercially and representing paraformaldehyde or other form of formaldehyde either dissolved in the selected alcohol or combined partly or wholly therewith in the form of an acetal or hemiacetal. In such a composition, the aldehyde is first reacted with the dicy and the condensation product formed is then etherified, that is, alkylated with the alcohol present. In fact, we usually react 4 mols of the alcohol in the etherification reaction. For this purpose, we use to advantage an excess of the alcohol as up to 25%–50% above that required theoretically to form the ether with the polymethylol derivative of dicy. An excess of the alcohol is unobjectionable and is in fact desirable, particularly when the alcohol used is volatile and, therefore, readily removed from the etherified product or when an excess of the alcohol is of value in the use to which the finished product is to be put.

The catalyst is used in proportions that vary somewhat with the rate of reaction desired. Proportions within the range 0.1 to 1 mol for 1 mol of the dicy in the composition are adequate. Ordinarily we use around 0.2 mol of the catalyst when it is a weak acid, such as an organic acid, and smaller proportions when the acid used as catalyst is strong as in the case of use of dilute sulfuric or hydrochloric acid. The acid should be adequate in amount to establish the pH below 7. Otherwise etherification is objectionably slow.

As to conditions of manufacture, the selected alcohol and catalyst are mixed with dicy and formaldehyde resin. For this reaction, the anhydrous condition, as, for example, an alcoholic solution, is best, water formed in the etherification being removed as the reaction proceeds.

When the resin is to be etherified with a polyhydric alcohol, the dicy resin made according to the said copending application is suitably evaporated to dryness, the resulting solid dissolved in the polyhydric alcohol selected for the etherification or alkylation, and the catalyst added. The resulting solution is warmed for a few hours or until the etherification reaction is substantially complete.

Products made as described are useful in the tanning of leather, particularly when the alcohol used in making the ether is methanol, ethanol, or propanol. For such use, the etherified material in solution is applied to pickled hides. The resin penetrates through the hide. Then the resin in the hide undergoes slow dealkylation or splitting followed by further polymerization under the influence of the acid therein or on the addition of other acid, preferably an organic acid, acidic salts, or dilute sulfuric acid. It is considered that the acid causes liberation of the alkyl radical from the etherified resin, with resulting decrease in solubility and stability and ultimate polymerization causing insolubility of the resin.

The products including those in which the resin is etherified with the polyhydric alcohols are useful also in varnishes, resin finishing compositions, textile printing compositions, and impregnating compositions such as give shrinkage and grease-proof effects to textiles or impart increased tensile and wet strength to paper.

The manufacture of the dicy and formaldehyde resin, from which the etherified material is prepared, is effected as described in the said copending application. An example follows.

A three-neck flask equipped with condenser, thermometer, agitator and reflux condenser was charged with 84 parts by weight of dicyandiamide (1 mol) and 292 parts of 38% formalin (3.7 mols of formaldehyde), along with 1.8 parts of borax to adjust the pH to a level above 7. Agitation was started and the temperature brought to refluxing, 95° C., and held there throughout the reaction. For a period of approximately 30 minutes, the mixture remained water soluble, that is, not precipitable on dilution with water, as described in the said Patent 2,567,238. On continued heating, the condensation product became insoluble by the same test, this showing formation of the desired intermediate product. After 210 minutes heating, however, the condensation product again became infinitely soluble (dilutable) in cold water. The heating was then stopped. If it is desired to dry the resin, the product is spray or drum dried.

Instead of preparing the dicy and formaldehyde resin in advance and then adding the alcohol as a separate step, the resin may be and preferably is prepared in contact with the alcohol for the etherification. In this alternative method, the dicy, formaldehyde and alcohol are heated together. The heating is effected first in contact with the catalyst for the condensation of dicy and formaldehyde, to give the tetramethylol derivative. Then, after this derivative has been formed, there is added the acid catalyst of the etherification of the alcohol with the polymethylol derivative first formed.

This invention will be further illustrated by description in connection with the following specific examples of the preparation of the new ethers or alkyl compounds.

In these examples and elsewhere herein, proportions are expressed as parts by weight unless specifically stated to the contrary.

*Example 1*

A mixture was made of 168 parts dicy (2 mols), 600 parts Methyl Formcel, and 3.6 parts of borax serving as catalyst. The Methyl Formcel is the commercial mixture containing 40% of formaldehyde, 53% of methanol and 7% of water. This corresponds to 4 mols of formaldehyde and approximately 5 mols of methanol for each mol of the dicy.

The mixture was refluxed at 83.0° C. for four hours. At that stage the material had become what is called a polymethylol derivative of the dicy and also water soluble, that is, non-precipitating on strong dilution with water.

There was then added glacial acetic acid as catalyst of etherification. Whereas the pH immediately before the addition of the acid was 8.8, the pH after the acetic acid addition was 6.8. The proportion of acetic acid used was 12 parts (0.2 mol).

The whole was then refluxed again at 83° C. for two hours. At the end of this time the mixture was non-precipitable on dilution with a large volume of alcohol or on the addition of an equal volume of 5% salt solution. Also the product was soluble in water.

The product is the polymethyl ether of the polymethylol dicy resin. It is considered that the "poly" in this case has a numerical value of at least 4 methylol groups, some or all of which are alkylated, to form the methyl ether. It is considered also that the reaction of the methylol groups and the molecules of methanol may be represented for convenience as follows:

$$R(CH_2OH)_4 + 4CH_3OH$$
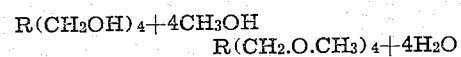
$$R(CH_2.O.CH_3)_4 + 4H_2O$$

In this equation, R represents a portion of the intermediate dicy resin, that is, the resin less 4 methylol groups or the original dicyandiamide less the 4 hydrogens.

*Example 2*

The procedure of Example 1 is followed except that the methyl component of the "Methyl Formcel" is replaced by an equal proportion by weight of the n-propyl radical. In other words, the "Methyl Formcel" is replaced by an equal weight "N-Propyl Formcel" containing again 40% of the formaldehyde and in this instance 53% of n-propyl alcohol.

*Example 3*

The procedure of Example 1 is followed except that the "Methyl Formcel" therein used is replaced by an equal molecular proportion of "Butyl Formcel" containing the same percentage of butyl alcohol as of methanol and the same percentage of formaldehyde as in Example 1. The product is soluble in alcohol and in xylol and like hydrocarbon solvents.

*Example 4*

The procedure of Example 1 is followed except that the "Methyl Formcel" therein used is replaced by 4 mols of formaldehyde and four equivalent weights of any one of the water soluble monohydric and polyhydric alcohols named earlier herein.

Example 5

Dicy and formaldehyde resin was prepared in solution, as described in the said copending application and also as described above, and then dried, as by spray or vacuum drying, the ratio of formaldehyde used being 4 mols to 1 mol. The dried material is then acidified to pH 6.8 with acetic acid and mixed with any of the alcohols listed above. The alcohol, when monohydric, is used in the ratio of 4 to 10 mols for 1 mol of dicy when the alcohol is a lower monohydric alcohol and 1 to 4 mols when the alcohol is polyhydric alcohol. The mixture is then heated at 80° C. until reaction substantially ceases. The product is soluble in alcohol.

Example 6

168 parts of dicyandiamide (2 mols) and 600 parts of "Propyl Formcel" (8 mols of formaldehyde), with no borax added, were refluxed for 4 hours at 80° C. Then there were added 596 parts castor oil fatty acids. The whole was heated 8 hours at 85°–90° C. and then for 5 hours at 95° C.

The product was soluble in 91% alcohol, insoluble in water, and soluble in xylol.

Example 7

84 parts of dicyandiamide were heated with 300 parts "N-Propyl Formcel." After 15 minutes at 60° C., the mixture became clear. It was then heated for 4 hours at 80° C. There were then added 280 parts linseed oil fatty acids. This gave a cloudy mixture. After 2 hours heating the product became clear. Heating was continued for 5 hours more at 80° C.

Example 8

84 parts of dicyandiamide (1 mol), ½ part borax, and 300 parts "N-Propyl Formcel" (4 mols formaldehyde) were refluxed 4 hours at 70° to 80° C. 250 parts China-wood oil fatty acids (1 mol) were then added and the whole heated to 85° to 90° C. for 5 hours.

Example 9

84 parts of dicyandiamide, 300 parts of "N-Propyl Formcel," and 280 parts of white oleic acid were heated for 7 hours at 70° to 80° C. This gave a clear product.

The products of Examples 6, 7, 8, and 9 are insoluble in water but soluble in alcohol. They are useful resins for paint and varnish formulation. The higher fatty acids used replace the acidic catalysts such as acetic acid of the earlier examples. The product is an acid colloid of n-propanol alkylation compound of the dicy resin.

Example 10

204 parts of spray dried resin made by evaporation of the liquid product (1 mol) of said copending application, now issued as Patent 2,567,238, and 368 parts of glycerine were heated on the water bath at 80° C. until the resin dissolved. Then there were added 12 parts of glacial acetic acid (0.2 mol). The whole was heated for 2 hours at 95° C. and then for 1 hour under vacuum, to complete the alkylation.

Example 11

42 parts of dicyandiamide (0.5 mol) and 187 parts of "Methyl Formcel" (2.5 mols of formaldehyde) were heated until clear at 80° C. (4 hours) and then the whole was mixed with 141.5 parts of stearylamide. The mixture was then heated 3 hours at 80° C. Then there were added 30 parts glacial acetic acid and the resulting mix heated for 4½ hours. Then 406.5 parts of water were added to reduce the concentration to 30%. The amide used is considered to replace a part of the alkyl groups introduced in the etherification described above. The product as made is a white stable, water dispersible paste. It is useful as textile sizing and as a water repellent.

Example 12

400 parts of polyethylene glycol (1 mol) and 30 parts of paraformaldehyde were heated to 85° C. The temperature then rose momentarily to 130° C. The mixture was then cooled to 95° C. and held there for 1 hour and 15 minutes. Then there were added 84 parts of dicyandiamide (1 mol). Then the temperature was maintained at 95° C. for 1 hour. Then 225 parts of "Methyl Formcel" were added and refluxed 3 hours at 95° C. Then 60 parts of glacial acetic acid (1 mol) were added and the whole refluxed 2 hours at 95° C.

The products made with polyhydric alcohols are soluble in water and to a limited extent in alcohol.

Example 13

The product of Examples 1, 2, or 3 is mixed with 4 mols of a higher ($C_4$ to $C_{18}$) aliphatic alcohol such as butyl, dodecyl, or octadecyl and the mixture boiled and fractionated until practically no more of the lower alcohol originally present passes out of the fractionation system.

The product is the ether of the polymethylol derivative of dicy with the selected one of the $C_4$ to $C_{18}$ alcohols. The product is soluble in alcohol and xylol.

Example 14

The procedure of Example 13 is repeated except that the $C_4$ to $C_{18}$ alcohol is replaced by a sugar such as dextrose, levulose, sucrose, or maltose, in proportion to provide 4 hydroxyl groups for each mol of dicy represented in the polymethylol derivative of the dicy.

The liquid mixtures made as described in the examples above may be neutralized, as with sodium carbonate or other alkali, to bring acidity down to about pH 7. Ordinarily this neutralizing is not required, particularly when the acid catalyst used is a weak acid.

When dried many of the products of the examples are pasty liquids.

It will be understood that it is intended to cover all changes and modifications of the examples of the invention herein chosen for the purpose of illustration which do not constitute departures from the spirit and scope of the invention.

What is claimed is:

1. In making a water soluble resin that is stable in aqueous solution, the method which comprises contacting dicyandiamide in aqueous solution with formaldehyde in the proportion of 3.6–5 mols for 1 mol of the dicyandiamide, adding an alkaline material in amount to establish the pH at a level above 7, maintaining contact of the dicyandiamide, formaldehyde and said material at an elevated temperature until the condensation occurs and the resulting product passes through a water precipitable stage to the water non-precipitable stage, introducing an unsubstituted aliphatic alcohol containing 1–3 carbon atoms to the molecule, introducing an acidic material after the said non-precipitable stage has been reached and in amount to lower the pH to a level below 7, and maintaining the resulting mixture at an elevated temperature, causing etherification, until substantially no more etherification results.

2. The method of claim 1 in which the alcohol is introduced after the said non-precipitable stage has been reached.

3. The method of claim 1 in which the proportion of the aliphatic alcohol used is at least approximately 4 mols to 1 mol of dicyandiamide used.

4. In making a water soluble resin that is stable in aqueous solution, the method which comprises warming a mixture of dicyandiamide, formaldehyde in the proportion of 3.6–5 mols for 1 mol of dicyandiamide, water, and an unsubstituted aliphatic alcohol containing 1–3 carbon atoms to the molecule at a pH above 7 until the tetramethylol derivative of dicyandiamide results and then at a pH below 7 until etherification of the said derivative with the said aliphatic alcohol is produced.

5. A resin characterized by being water soluble and non-gelling and resistant to precipitation by electrolytes in aqueous solution, the resin being the ether of a water soluble unsubstituted aliphatic alcohol containing 1–3 carbon atoms to the molecule with the polymethylol derivative of dicyandiamide, the said derivative being the product of reaction of dicyandiamide with formaldehyde in the proportion of 3.6–5 mols to 1 mol of the dicyandiamide at a pH above 7 and the resin being the product of the method of claim 1.

6. In making a resin that is stable in contact with water, the method which comprises contacting dicyandiamide in aqueous solution with formaldehyde in the proportion of 3.6–5 mols for 1 mol of the dicyandiamide, adding an alkaline material in amount to establish the pH at a level above 7, maintaining contact of the dicyandiamide, formaldehyde and said material at an elevated temperature until condensation occurs and the condensation product passes through a water precipitable stage to the stage of being non-precipitable by water, introducing an alcohol, introducing an acidic material after the said condensation has occurred and in amount to lower the pH to a level below 7, and maintaining the resulting mixture at an elevated temperature, causing etherification, until substantially no more etherification occurs, the alcohol being one selected from the group consisting of methanol, ethanol, iso- and n-propanol; ethylene, propylene, butylene, and polyethylene glycol; glycerine; pentaerythritol; sorbitol; and dextrose, levulose and sucrose.

7. A resin characterized by being water soluble and resistant to precipitation by electrolytes in aqueous solution, the resin being the ether of a water soluble aliphatic alcohol with the polymethylol derivative of dicyandiamide, the said aliphatic alcohol being one selected from the group consisting of methanol, ethanol, iso- and n-propanol; ethylene, propylene, butylene, and polyethylene glycol; glycerine; pentaerythritol; sorbitol; and dextrose, levulose, and sucrose, and the resin being the product of the method of claim 6.

8. A resinous composition comprising the combination of a higher fatty acid with an ether of the water soluble resinous condensation product of 3.6 to 5 mols of formaldehyde with 1 mol of dicyandiamide, the said ether being that described in claim 7.

References Cited in the file of this patent

UNITED STATES PATENTS

| Number | Name | Date |
|---|---|---|
| 2,317,181 | D'Alelio | Apr. 20, 1943 |
| 2,567,238 | Sellet | Sept. 11, 1951 |

FOREIGN PATENTS

| Number | Country | Date |
|---|---|---|
| 545,081 | Great Britain | May 11, 1942 |
| 850,892 | France | Sept. 18, 1939 |

OTHER REFERENCES

Powers, Synthetic Resins and Rubbers, page 86, John Wiley and Sons, Inc., New York (1943).